United States Patent
Takeshita

(10) Patent No.: US 8,272,465 B2
(45) Date of Patent: Sep. 25, 2012

(54) ELECTRIC VEHICLE

(75) Inventor: Masahiro Takeshita, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 337 days.

(21) Appl. No.: 12/679,771

(22) PCT Filed: Sep. 10, 2008

(86) PCT No.: PCT/JP2008/066341
§ 371 (c)(1),
(2), (4) Date: Mar. 24, 2010

(87) PCT Pub. No.: WO2009/041268
PCT Pub. Date: Apr. 2, 2009

(65) Prior Publication Data
US 2010/0200313 A1    Aug. 12, 2010

(30) Foreign Application Priority Data
Sep. 25, 2007  (JP) ................................. 2007-247988

(51) Int. Cl.
*B62D 25/20* (2006.01)
*B60K 11/06* (2006.01)
*B60J 11/06* (2006.01)

(52) U.S. Cl. ...... 180/69.1; 180/68.1; 280/770; 280/848; 280/851; 296/38; 296/184.1

(58) Field of Classification Search ............... 280/770, 280/847, 848, 851, 159; 180/69.1, 68.1, 180/68.2; 296/38, 204, 184.1
See application file for complete search history.

(56) References Cited

U.S. PATENT DOCUMENTS

| | | | | |
|---|---|---|---|---|
| 4,655,307 A | * | 4/1987 | Lamoureux | 180/69.1 |
| 6,202,778 B1 | * | 3/2001 | Mistry et al. | 180/69.1 |
| 2002/0050413 A1 | * | 5/2002 | Renault | 180/69.1 |
| 2004/0231898 A1 | * | 11/2004 | Hochkoenig et al. | 180/68.1 |
| 2005/0051372 A1 | * | 3/2005 | Guertler | 180/68.1 |

FOREIGN PATENT DOCUMENTS

| | | |
|---|---|---|
| JP | 62-68879 U | 4/1987 |
| JP | 2005-193748 A | 7/2005 |
| JP | 2006-335212 A | 12/2006 |
| JP | 2006-347266 A | 12/2006 |

* cited by examiner

*Primary Examiner* — John R Olszewski
(74) *Attorney, Agent, or Firm* — Kenyon & Kenyon LLP

(57) ABSTRACT

In an electric vehicle, the generation of unusual sounds due to the movement of snow and ice remaining in an undercover is prevented, thereby enhancing silence. An electric vehicle comprising an undercover arranged below a vehicle floor is provided. The undercover comprises: a substantially flat-plate cover body that covers the vehicle floor from the vehicle front side to the vehicle rear side; a discharge portion for discharging snow and ice that have entered between the vehicle floor and the cover body; and an upward protruding portion which is arranged on the vehicle front side relative to the discharge portion and which is formed to extend in a vehicle width direction and to protrude upwardly from the plane including the cover body.

3 Claims, 4 Drawing Sheets

ELECTRIC VEHICLE

FIELD OF THE INVENTION

This is a 371 national phase application of PCT/JP2008/066341 filed 10 Sep. 2008, which claims priority to Japanese Patent Application No. 2007-247988 filed 25 Sep. 2007 the contents of which are incorporated herein by reference.

The present invention relates to an electric vehicle.

An electric vehicle that employs, as a driving source for a vehicle, a power supply such as a fuel cell or a battery has been proposed and put to practical use. In the electric vehicle, electric power supplied from the power supply drives an electric motor, and the torque of the electric motor rotates drive wheels, thereby attaining driving of the vehicle. The electric vehicle has superior silence compared with a vehicle in which an engine is installed.

In recent years, with the purpose of preventing various equipment (e.g., fuel cell) installed in such an electric vehicle from making contacts with obstacles on a road and reducing air resistance of the electric vehicle, the technique of arranging an undercover below a vehicle floor of an electric vehicle has been proposed (for example, see Patent Document 1).

[Patent Document 1] Japanese laid-open patent publication No. 2006-335212

SUMMARY OF THE INVENTION

Problem to be Solved by the Invention

However, when employing a conventional technique such as that disclosed in Patent Document 1 above, snow and ice that have entered the inside of the undercover (space between the vehicle floor and the undercover) moves to the vehicle front side due to an impact caused when the vehicle is stopped or during driving on a descending slope, and thus becomes difficult to be discharged from the vehicle rear side. The snow and ice that enter the inside of the undercover and remains without being discharged, as described above, has generated unusual sounds due to the movement of the remaining snow and ice, leading to a decrease in silence of the electric vehicle.

The present invention has been made in light of the above circumstances, and an object of the present invention is to prevent the generation of unusual sounds due to the movement of snow and ice remaining in an undercover, thereby enhancing silence in an electric vehicle.

In order to attain the above object, the present invention provides an electric vehicle comprising an undercover arranged below a vehicle floor, in which the undercover comprises: a substantially flat-plate cover body that covers the vehicle floor from the vehicle front side to the vehicle rear side; a discharge portion for discharging snow and ice that have entered between the vehicle floor and the cover body; and an upward protruding portion which is arranged on the vehicle front side relative to the discharge portion and which is formed to extend in a vehicle width direction and to protrude upwardly from a plane including the cover body.

With the above configuration, the undercover is provided with the discharge portion and the upward protruding portion. Therefore, the snow and ice that have entered between the vehicle floor and the cover body can be prevented from moving toward the vehicle front side, and the discharge of the snow and ice toward the vehicle rear side can be facilitated. Accordingly, the generation of unusual sounds in the undercover can be prevented, thereby enhancing silence.

The electric vehicle may be provided with a retainer which is arranged between the vehicle floor and the cover body and which extends in the vehicle width direction. In such a case, the upward protruding portion is preferably arranged on the vehicle front side relative to the retainer. Also, the upward protruding portion which is constituted by: an inclined portion formed to extend both toward the vehicle rear side and upwardly from the plane including the cover body; and a downward extended portion formed to extend downwardly from an upper end of the inclined portion toward the plane including the cover body, is preferably employed.

With the above configuration, the upward protruding portion of the undercover is arranged on the vehicle front side relative to the retainer, and has the inclined portion formed to extend both toward the vehicle rear side and upwardly from the plane including the cover body. Therefore, the snow and ice that have entered from the vehicle front side can be brought onto the inclined portion of the upward protruding portion so as to be guided both toward the vehicle rear side and upwardly. Accordingly, the snow and ice that have entered from the vehicle front side becomes easy to go over the retainer to move toward the vehicle rear side.

Also, the electric vehicle is preferably provided with a shielding member which is arranged in the vicinity of a vehicle front end portion of the cover body and which shields a space between the vehicle floor and the cover body.

With the above configuration, snow and ice can be prevented from entering the space between the vehicle floor and the cover body.

Effect of the Invention

According to the present invention, unusual sounds due to the movement of snow and ice remaining in the undercover can be prevented, thereby enhancing silence in the electric vehicle.

DETAILED DESCRIPTION

An electric vehicle according to an embodiment of the invention will be described below with reference to the attached drawings. In this embodiment, a fuel cell vehicle 1, which employs, as a driving source, electric power supplied from a fuel cell, will be described as an example of the electric vehicle.

First, the overall configuration of the fuel cell vehicle 1 according to the embodiment will be described with reference to FIGS. 1 and 2. The fuel cell vehicle 1 is provided with a vehicle body 10, seats 20 for seating occupants, a floor frame 30 arranged below the seats 20, wheels for driving (front wheels 40 and rear wheels 50), a front undercover 60 that covers from below a suspension member (not shown) arranged in the vicinity of the front wheels 40, a rear undercover 70 that covers from below a hydrogen tank (not shown) arranged in the vicinity of the rear wheels 50, a floor undercover 80 that covers from below the floor frame 30, etc.

The floor frame 30 corresponds to a vehicle floor in the invention. The floor undercover 80 is constituted by a center undercover 81 arranged in the center portion in a vehicle width direction and side undercovers 82 arranged in both the end parts in the vehicle width direction, as shown in FIG. 2.

Next, the configuration of each of the side undercovers 82 of the fuel cell vehicle 1 according to this embodiment will be described with reference to FIGS. 3 and 4.

The side undercover 82 has: a substantially flat-plate cover body 83 that covers one of the end portions in the vehicle width direction from the vehicle front side to the vehicle rear side; a retainer 84 which is arranged between the floor frame 30 and the cover body 83 and which extends in the vehicle width direction; and an upward protruding portion 85 arranged on the vehicle front side relative to the retainer 84, as shown in FIG. 3.

The cover body 83 is a flat-plate member with a long length and a short width which is long in a vehicle front-back direction and which is short in the vehicle width direction, as shown in FIG. 3. A shielding member 86 is provided in the vicinity of a vehicle front end portion 83a of the cover body 83. The shielding member 86 shields the space between the floor frame 30 and the cover body 83 to prevent snow and ice from entering, from the vehicle front side, the inside of the side undercover 82 (the space between the floor frame 30 and the cover body 83). The shielding member 86 may be formed of a rubber material, a resin material, a foam of either of the materials, etc.

Meanwhile, a shielding member for shielding the space between the floor frame 30 and the cover body 83 is not provided in the vicinity of a vehicle rear end portion 83b of the cover body 83, but drain holes 83c are provided. Also, as shown in FIG. 1, the entire side undercover 82 including the cover body 83 is arranged to be downwardly inclined toward the vehicle rear side, and the vehicle rear end portion 83b of the cover body 83 is positioned below the vehicle front end portion 83a in a vertical direction. Therefore, snow and ice that have entered the inside of the side undercover 82 from the vehicle front side is discharged to the outside through the drain holes 83c provided in the vehicle rear end portion 83b of the cover body 83. In short, the drain holes 83c of the cover body 83 correspond to a discharge portion in the invention.

As shown in FIG. 3, the upward protruding portion 85 is arranged on the vehicle front side slightly relative to a substantially intermediate portion in the vehicle front-back direction of the cover body 83, and is formed to protrude upwardly from a plane including the cover body 83 and to extend in the vehicle width direction. As shown in FIG. 4, the upward protruding portion 85 is constituted by: an inclined portion 85a formed to extend both toward the vehicle rear side and upwardly from the plane including the cover body 83; and a downward extended portion 85b formed to extend downwardly from an upper end of the inclined portion 85a toward the plane including the cover body 83. The upward protruding portion 85 is arranged, on the vehicle front side, close to the retainer 84. Therefore, snow and ice S that have entered the inside of the side undercover 82 from the vehicle front side can be brought onto the inclined portion 85a of the upward protruding portion 85 to be guided both toward the vehicle rear side and upwardly.

Next, a snow and ice discharge action in the case where snow and ice have entered the inside of the side undercover 82 of the fuel cell vehicle 1 according to this embodiment will be described.

In a conventional fuel cell vehicle, snow and ice enter the inside of an undercover due to the front wheels causing the snow and ice to rise during driving on a snowy road. The snow and ice that have entered the inside of the undercover moves to the vehicle front side due to an impact caused when the vehicle is stopped or while driving a descending slope, and thus, becomes difficult to be discharged from the vehicle rear side. Therefore, the movement of the snow and ice remaining in the undercover has generated unusual sounds.

By contrast, in the fuel cell vehicle 1 according to this embodiment, even when the front wheels 40 cause snow and ice to rise during driving on a snowy road, the snow and ice can be prevented from entering the inside of the side undercover 82 since the shielding member 86 for shielding the space between the floor frame 30 and the cover body 83 is provided on the vehicle front side of the side undercover 82.

Also when the snow and ice enter the inside of the side undercover 82, the inclined portion 85a of the upward protruding portion 85 guides the snow and ice both toward the vehicle rear side and upwardly to have the snow and ice go over the retainer 84, so that the snow and ice can be moved to the vehicle rear side. The snow and ice can be finally discharged to the outside through the drain holes 83c of the cover body 83.

In the fuel cell vehicle 1 according to the embodiment described above, the side undercover 82 is provided with the drain holes 83c and the upward protruding portion 85. Therefore, the snow and ice that have entered the space between the floor frame 30 and the cover body 83 can be prevented from moving to the vehicle front side, and the discharge of the snow and ice toward the vehicle rear side can be facilitated. Accordingly, the generation of unusual sounds in the side undercover 82 can be prevented, thereby enhancing silence.

In the fuel cell vehicle 1 according to the embodiment described above, the upward protruding portion 85 of the side undercover 82 is arranged on the vehicle front side relative to the retainer 84, and has the inclined portion 85a formed to extend from the plane including the cover body 83 both toward the vehicle rear side and upwardly. Therefore, the snow and ice that have entered from the vehicle front side can be brought onto the inclined portion 85a of the upward protruding portion 85 to be guided both toward the vehicle rear side and upwardly. Accordingly, the snow and ice that have entered from the vehicle front side becomes easy to go over the retainer 84 to move to the vehicle rear side.

In the fuel cell vehicle 1 according to the embodiment described above, the shielding member 86 for shielding the space between the floor frame 30 and the cover body 83 is provided in the vicinity of the vehicle front end portion 83a of the cover body 83 of the side undercover 82. Accordingly, snow and ice can be prevented from entering the inside of the side undercover 82.

The above embodiment shows the example in which the present invention is applied to the side undercovers 82 arranged in both the end portions in the vehicle width direction of the floor undercover 80. Alternatively, the invention may be applied to the center undercover 81 arranged in the center portion of the floor undercover 80.

Also, the above embodiment shows an example in which the upward protruding portion 85 constituted by the inclined portion 85a and the downward extended portion 85b is employed. However, the shape of the upward protruding portion 85 is not limited to the shape in the example. More specifically, an upward protruding portion of any shape may be employed as long as: the shape makes it easy for snow and ice that have entered the inside of the side undercover 82 from the vehicle front side to move to the vehicle rear side; and also the shape makes it difficult for the snow and ice that have moved to the vehicle rear side to return to the vehicle front side.

INDUSTRIAL APPLICABILITY

The present invention may be applied to fuel cell vehicles as shown in the above embodiment, and also may be applied to not only to the fuel cell vehicles but also to other electric vehicles (electric cars, hybrid vehicles, etc.). Moreover, the invention may be applied to vehicles other than electric vehicles as long as they are each provided with an undercover arranged below a vehicle floor.

DESCRIPTION OF REFERENCE NUMERALS

Figure 1:
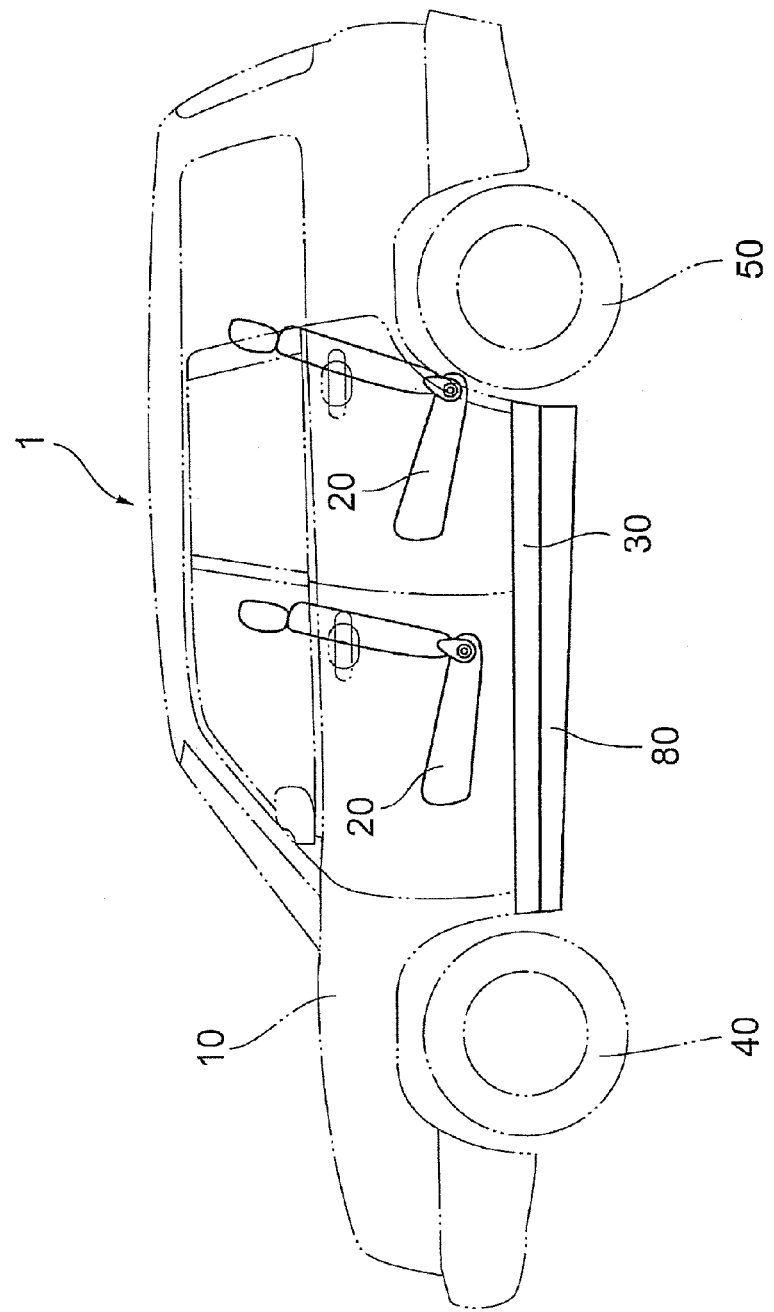
FIG. 1 It is a side view of an electric vehicle (fuel cell vehicle) according to an embodiment of the invention.
Figure 2:
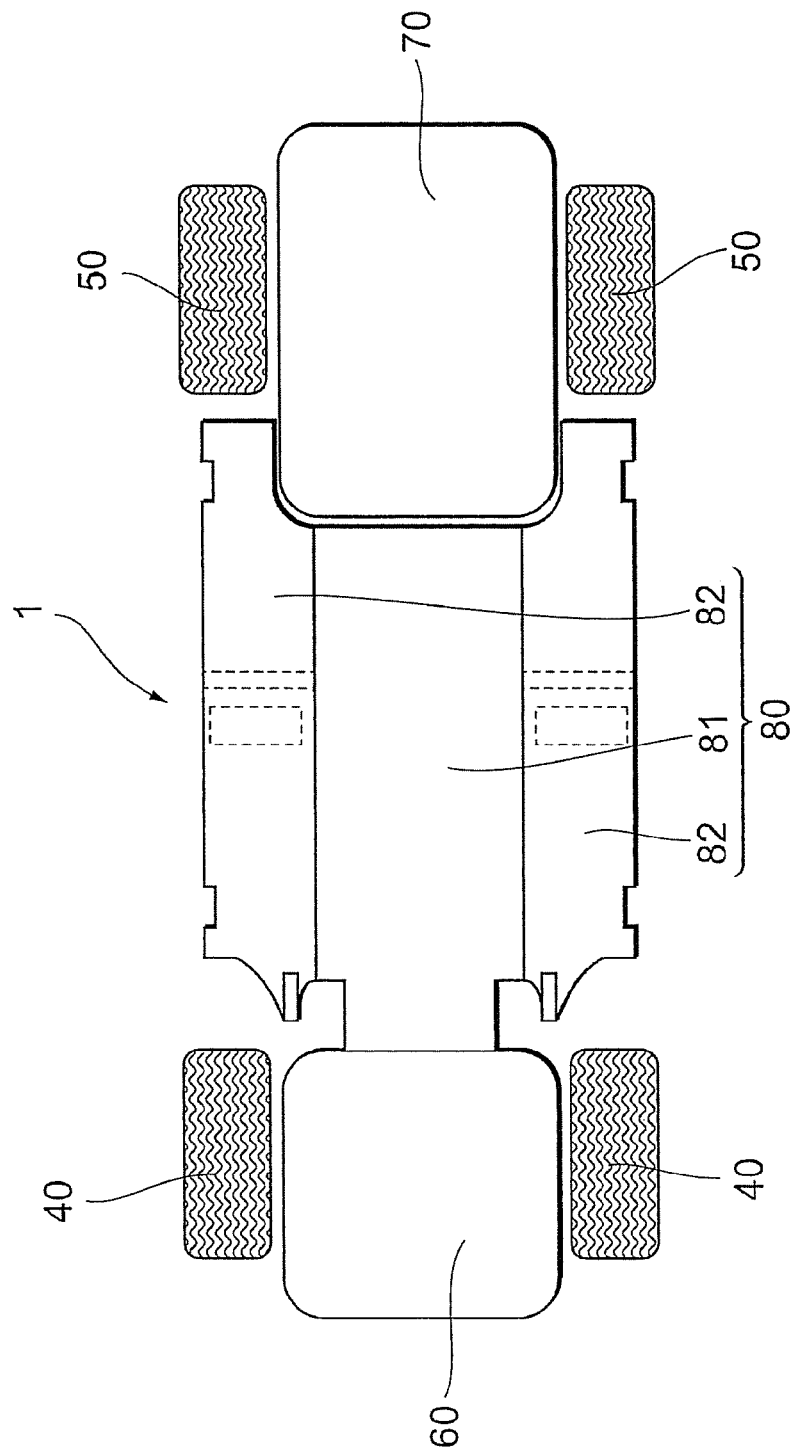
FIG. 2 It is a bottom view of the fuel cell vehicle illustrated in FIG. 1.
Figure 3:
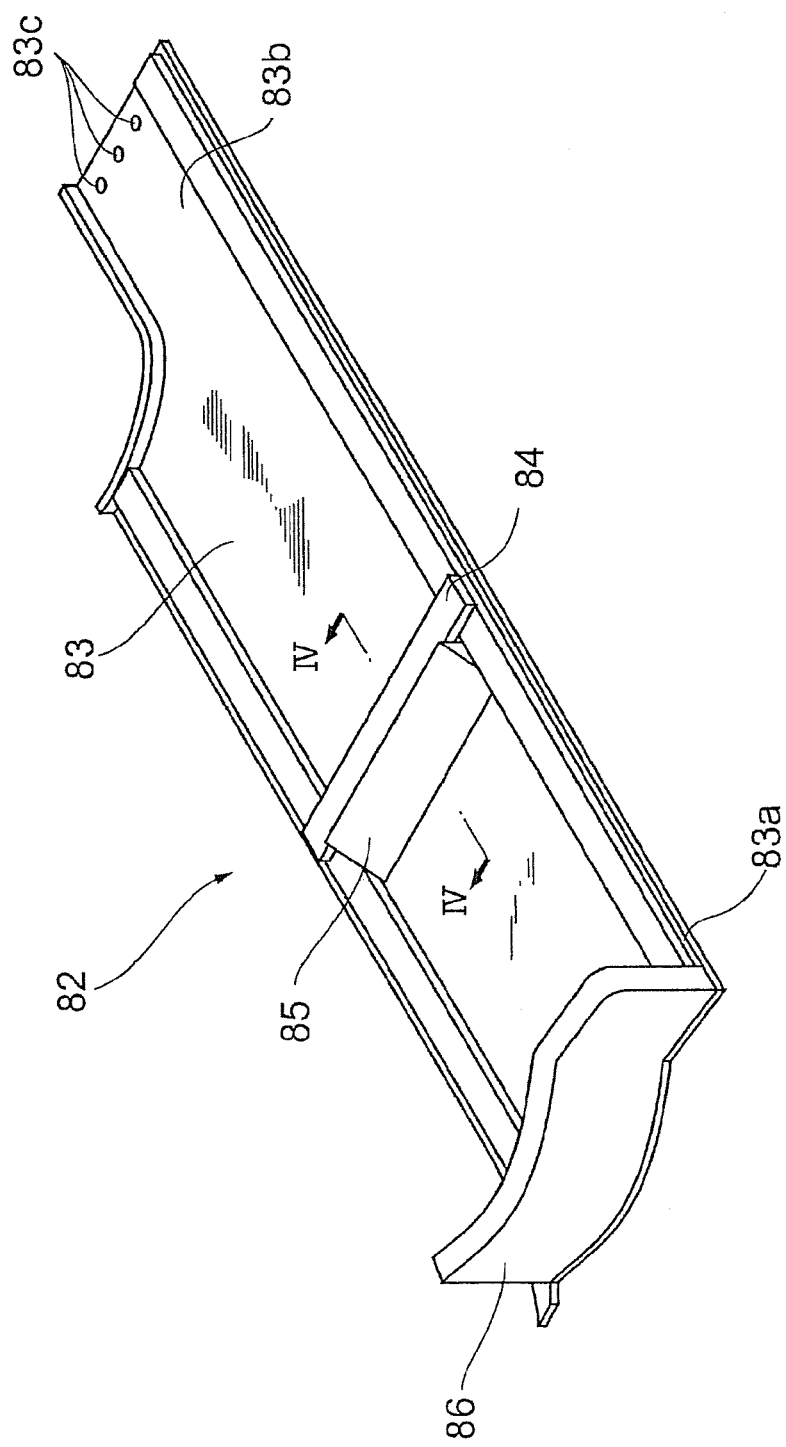
FIG. 3 It is a perspective view of a side undercover of the fuel cell vehicle illustrated in FIG. 1.
Figure 4:
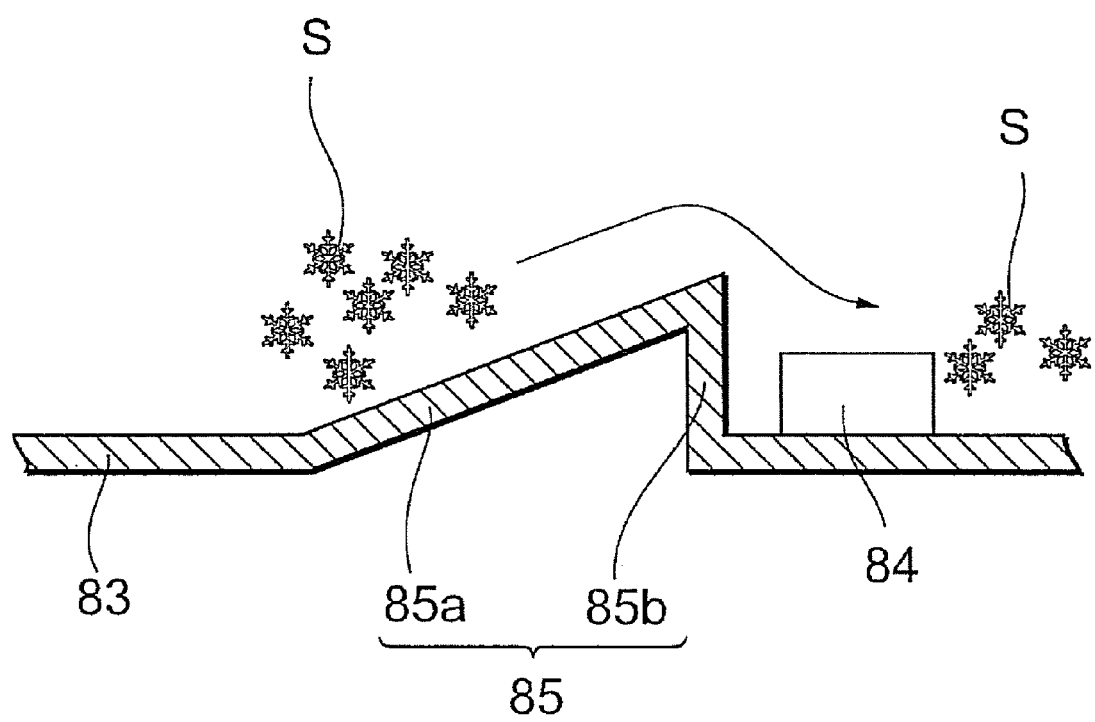
FIG. 4 It is a sectional view taken along portion IV-IV of the side undercover illustrated in FIG. 3.

1: fuel cell vehicle (electric vehicle), 10: vehicle body, 30: floor frame (vehicle floor), 82: side undercover, 83: cover body, 83c drain hole (discharge portion), 84: retainer, 85: upward protruding portion, 85a: inclined portion, 85b: downward extended portion, 86: shielding member, S: snow and ice.

The invention claimed is:

1. An electric vehicle comprising an undercover arranged below a vehicle floor, wherein the undercover comprises:
   a substantially flat-plate cover body that covers the vehicle floor from the vehicle front side to the vehicle rear side;
   a discharge portion for discharging water that has entered between the vehicle floor and the cover body; and
   a protruding portion located on the vehicle front side relative to the discharge portion and which extends in a vehicle width direction, the protruding portion comprising: (a) an upwardly inclining portion that extends both toward the vehicle rear side and inclines upwardly from the plane including the cover body; and (b) a downward extending portion that extends downwardly from an upper end of the inclined portion toward the plane including the cover body.

2. The electric vehicle according to claim 1, further comprising a retainer which is arranged between the vehicle floor and the cover body and which extends in the vehicle width direction, wherein the protruding portion is arranged on the vehicle front side relative to the retainer.

3. The electric vehicle according to claim 1, further comprising a shielding member which is arranged in the vicinity of a vehicle front end portion of the cover body and which shields a space between the vehicle floor and the cover body.

* * * * *

UNITED STATES PATENT AND TRADEMARK OFFICE
CERTIFICATE OF CORRECTION

PATENT NO. : 8,272,465 B2  
APPLICATION NO. : 12/679771  
DATED : September 25, 2012  
INVENTOR(S) : Masahiro Takeshita Page 1 of 1

It is certified that error appears in the above-identified patent and that said Letters Patent is hereby corrected as shown below:

In the Specifications:

| Column | Line | |
|---|---|---|
| 1 | 3 | Delete "FIELD OF THE INVENTION". |
| 1 | 8-9 | Between lines 8 and 9, insert: --FIELD OF THE INVENTION--. |

Signed and Sealed this  
Fifteenth Day of January, 2013

David J. Kappos  
*Director of the United States Patent and Trademark Office*